United States Patent [19]

Plummer

[11] 4,162,833
[45] Jul. 31, 1979

[54] PHOTOGRAPHIC CAMERA

[75] Inventor: William T. Plummer, Concord, Mass.

[73] Assignee: Polaroid Corporation, Cambridge, Mass.

[21] Appl. No.: 824,416

[22] Filed: Aug. 15, 1977

Related U.S. Application Data

[60] Division of Ser. No. 529,904, Dec. 5, 1974, abandoned, which is a continuation-in-part of Ser. No. 428,454, Dec. 26, 1973, abandoned.

[51] Int. Cl.² ............................................. G09B 17/52
[52] U.S. Cl. ..................................... 354/86; 354/150; 354/197; 354/210
[58] Field of Search ............... 354/197, 119, 210, 150, 354/110, 111, 104, 83–86; 350/19, 190, 212, 54, 203; 355/66

[56] References Cited

U.S. PATENT DOCUMENTS

| | | | |
|---|---|---|---|
| 882,762 | 3/1908 | Jacob | 350/190 X |
| 1,842,561 | 1/1932 | Nelms et al. | 354/62 |
| 2,081,329 | 5/1937 | Gordon | 355/19 |
| 2,324,076 | 7/1943 | Goldberg | 350/190 X |
| 2,434,378 | 1/1948 | Wekeman | 355/66 X |
| 2,592,524 | 4/1952 | Grant | 354/150 |
| 2,764,065 | 9/1956 | Buchele | 350/190 X |
| 3,185,061 | 5/1965 | Westphalen | 354/197 |
| 3,575,081 | 4/1971 | Nerwin | 354/79 X |
| 3,608,456 | 9/1971 | Hauser | 354/119 X |
| 3,643,570 | 2/1972 | Reid et al. | 354/119 |
| 3,699,865 | 10/1972 | Erlichman | 354/152 |
| 3,887,930 | 6/1975 | Bresson | 354/197 X |

FOREIGN PATENT DOCUMENTS 1024444  1/1953  France ..................................... 354/197

Primary Examiner—John Gonzales
Attorney, Agent, or Firm—Alfred E. Corrigan

[57] ABSTRACT

Photographic apparatus having an optical system which in a first mode of operation functions to image a subject upon a film plane so as to be geometrically reversed along only one axis of the film plane and in a second mode of operation functions to image the subject on the film plane so as to be geometrically reversed along each of two orthogonal axes, the particular mode being dependent upon the type of film unit being exposed.

8 Claims, 12 Drawing Figures

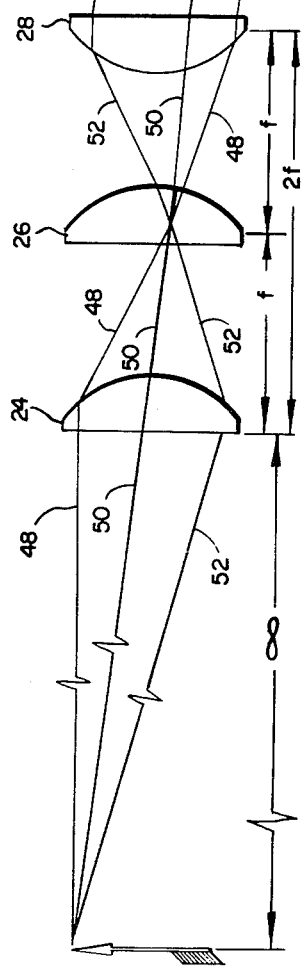
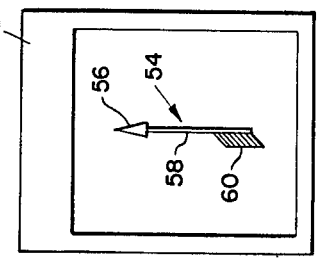
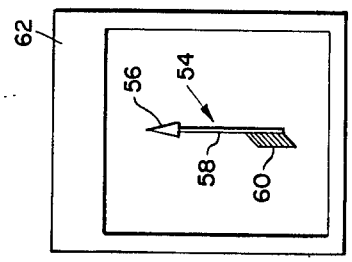
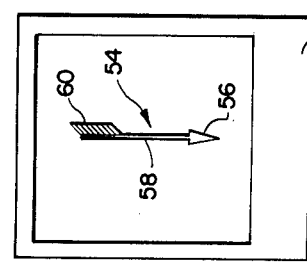
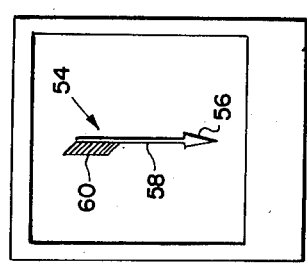

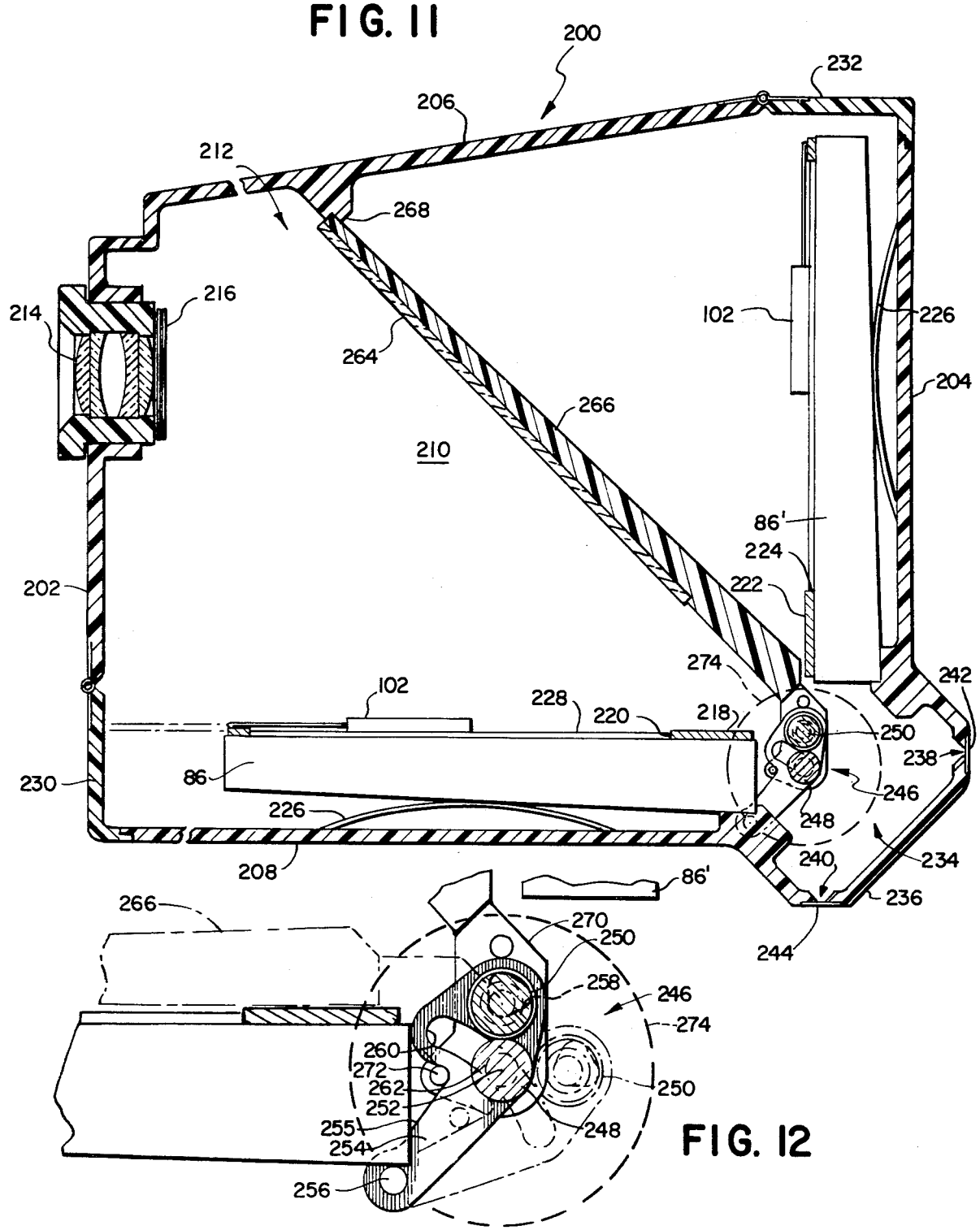

PHOTOGRAPHIC CAMERA

CROSS REFERENCE TO RELATED APPLICATION

This application is a division of my copending application Ser. No. 529,904 filed Dec. 5, 1974, now abandoned which is a continuation-in-part of application Ser. No. 428,454, filed Dec. 26, 1973, now abandoned. This application is also related to my application Ser. No. 824,415 entitled PHOTOGRAPHIC CAMERA, filed on even date herewith.

BACKGROUND OF THE INVENTION

1. Field of the Invention

This invention relates to photographic apparatus, preferably cameras of the self-developing type, having an optical system capable of selectively geometrically reversing an image of a subject on a film plane along either one axis or along each of two orthogonal axes.

2. Description of the Prior Art

Certain photographic film materials are structured to directly record a positive image of any subject properly imaged and exposed thereupon. Exemplary of such materials are the film units described in U.S. Pat. No. 3,415,644, entitled NOVEL PHOTOGRAPHIC PRODUCTS AND PROCESSES and issued to E. H. Land on Dec. 10, 1968. Film units of this type are intended for use within the above-noted self-developing or self-processing photographic cameras and incorporate all of the materials necessary to produce a positive photographic print immediately following their exposure. While being of a somewhat complex chemical makeup, the film units are physically structured to include a planar photosensitive element in laminar combination with a transparent image-receiving element. Specially packaged processing units are additionally included within the units. By virtue of the structural parameters of the film units identified above, the transfer image formed upon direct exposure of the film unit to a selected subject and processing will be a geometrically reversed image of the subject along one direction, e.g., the transverse direction of the film plane.

Accordingly, to provide transfer image formation geometrically non-reversed, exposure of the film unit should be accomplished through an appropriate image reversing optical system.

In order to accomplish such optical image reversing, previous cameras designed for use with such film units necessarily included one or an odd number of specular surfaces incorporated within the optical path extending from the camera lens to the exposure plane of a film unit. Because these film units are configured to provide a desirably large film format, certain improved photographic camera designs have taken advantage of the requisite specular surface to achieve somewhat compact overall camera structures.

Exemplary of such compact designs is a camera structure described in U.S. Pat. No. 3,699,865, issued Oct. 24, 1972 and entitled PHOTOGRAPHIC APPARATUS. This type of a camera incorporates a moving reflex member which permits a somewhat compact design but nevertheless succumbs to the disavantages normally associated with reflex cameras incorporating movable reflex members. Typically, one such problem is the time delay between actuation of the camera's shutter release button and the exposure of the film unit located in position for exposure. During this time delay, the user of the camera must hold the camera relatively steady until the camera's shutter is closed. The viewfinder and/or rangefinder are conditioned to prevent the entry of actinic light into the interior of the camera until the reflex mirror or a reflecting member has moved to a position which will allow exposure of the film unit, and the camera's shutter has opened and closed to allow the exposure. Furthermore, the reflex member must move at such a speed that additional problems such as jerking of the camera caused by impact of the reflex member may occur.

Additionally, the mechanism necessary to move the reflex member between exposure and viewing mode positions is quite costly and complex so as to admit of both production and operational difficulties Conversely, certain photographic materials are structured such that the transfer image formed upon direct exposure of the film unit to a selected subject and processing will be geometrically non-reversed. Exemplary of such film units are those described in U.S. Pat. No. 2,983,606 entitled PROCESSES AND PRODUCTS FOR FORMING PHOTOGRAPHIC IMAGES IN COLOR and issued to H. G. Rogers on May 9, 1961, and U.S. Pat. No. 3,761,271 entitled FILM ASSEMBLAGE FOR COLOR DIFFUSION TRANSFER FILM and issued to H. G. Rogers on Sept. 25, 1973. Therefore, these film units are not compatible with a camera whose optical system only provides for an odd number of geometrical reversals.

Heretofore, it has been known to provide a camera with an optical system capable of geometrically reversing the image of a subject an even number of times onto one negative and an odd number of times onto a second negative, e.g., see U.S. Pat. No. 1,298,641 granted to Barnes et al on Apr. 1, 1919. However, this type of camera does not teach the inventive concept of a camera which is adapted for use with both types of film units, i.e., those requiring an even number of geometrical reversals and those requiring an odd number to provide a non-reversed positive image in the film unit in response to a single exposure. To the contrary, cameras of the type shown by Barnes et al use the same type of film for both exposures and two exposures are required to produce a scene which may be viewed by transmitted light. Obviously, the versatility of this type of camera is very limited.

SUMMARY OF THE INVENTION

The instant invention relates to photographic apparatus, preferably cameras of the self-developing type, adapted for use with film units requiring an even number of geometrical reversals, i.e., 0, 2, 4, etc., and with film units requiring an odd number of geometrical reversals, i.e., 1, 3, 5, etc., to provide a non-reversed positive image in the film unit. In one embodiment, the camera is provided with an objective lens assembly including an otherwise conventional objective lens subassembly and a readily detachable cylindrical lens subassembly. The cylindrical lens subassembly includes a first cylindrical lens, i.e., a lens curved only in one sense so that its curved contours are segments of a cylinder, and a second cylindrical lens which is preferably of the same focal length as the first cylindrical lens and which is spaced from the first cylindrical lens a distance approximately equal to twice their common focal length.

A third cylindrical lens element is positioned midway between said first and second cylindrical lens elements such that the axes of curvature of the first, second and third cylindrical lens elements are parallel. The third cylindrical lens element functions as a field lens and essentially images the first cylindrical lens onto the second cylindrical lens so as to increase the amount of light passing through the second cylindrical lens and hence increase the brightness of any image viewed through the entire lens assembly.

The first and second cylindrical lenses (if properly positioned opposite each other as aforesaid so that a pencil of parallel rays passing through the first cylindrical lens will emerge from the second cylindrical lens in a direction parallel to that at which it entered the first cylindrical lens) will function as a reversing system, that is, they will reverse the image of a subject in only one sense. In essence, the first and second cylindrical lenses form a lens assembly of the type depicted in U.S. Pat. No. 882,762, which issued to H. Jacob on Mar. 24, 1908.

With the arrangement as described, it is necessary that the subject be positioned at a distance from the first cylindrical lens which is great in comparison to the focal length thereof so that the subject is essentially at infinity. With the subject so positioned, an observer looking through the second cylindrical lens will see a virtual image of the subject at infinity which is reversed in one sense. With the cylindrical lens subassembly as depicted above, the conventional objective lens subassembly will focus an image of the subject at the film plane which is reversed in one sense only and because of the structural parameters of film units of the type described in U.S. Pat. No. 3,415,644, the transfer image formed upon exposure of the film unit through the lens assembly will be geometrically reversed in one sense so that the recorded image will appear in the same sense as the subject.

In another embodiment of the invention, the optical system of the camera includes a conventional objective lens assembly and optical means including a pivotally mounted cylindrical lens assembly and a reflecting member, e.g., a mirror. When the film unit being exposed requires one geometrical reversal to provide a non-reversed positive image in the film unit, the cylindrical lens assembly is moved out of optical alignment with the conventional lens assembly and the mirror. When the film unit requires an even number of geometrical reversals, the cylindrical lens assembly is moved into optical alignment with the conventional lens assembly and mirror.

In still another embodiment, the optical system consists of a conventional lens assembly and a cylindrical lens assembly of the type described. The cylindrical lens assembly is normally mounted in optical alignment with the conventional lens assembly for exposure of a film unit of the type which requires an odd number of geometrical reversals to provide a non-reversed positive image in the film unit. The camera also includes a linkage system coupled to the cylindrical lens assembly for moving it out of optical alignment with the conventional lens assembly. A portion of the linkage system is mounted in position to be engaged and moved by a portion of a film cassette, containing a film unit requiring an even number of geometrical reversals, during loading of the film cassette into the camera. This latter movement actuates the linkage system to move the cylindrical lens assembly out of optical alignment with the conventional lens assembly thereby automatically correlating the optics of the camera with the type of film being used.

In still another embodiment of the invention, the camera optics comprise a conventional lens assembly and a pivotally mounted reflecting member. The camera also includes first and second chambers, each of which is dimensioned to receive a film casssette, and a pair of pressure applying members, e.g., rollers. The pivotally mounted reflecting member is normally mounted in a first position wherein it is in optical alignment with the conventional lens assembly to reflect the image of the subject onto a film unit located in a film cassette located in the first chamber while simultaneously preventing any light from striking a film unit located in the second chamber. After exposure of the film unit in the first chamber, conventional means are provided for advancing the exposed film unit through the rollers which in turn spread a processing fluid across the photosensitive element of the film unit to initiate formation of a visible positive image therein. When it is desired to expose one of the film units in the second chamber, i.e., a film unit which requires an even number of geometrical reversals, the reflecting member is manually rotated into a second position wherein it is out of optical alignment with the conventional lens assembly and into lighttight relation with the first chamber. Exposure of the film unit in the second chamber is then made solely by the conventional lens thereby providing an image on the photosensitive layer or negative of the film unit which is reversed along two orthogonal axes. During movement of the reflecting member into the second position, one of the rollers is moved through an angle of ninety degrees to a position wherein it cooperates with the other roller to define a pressure-generating gap located in position to receive the exposed film unit as it is advanced from the second chamber.

It is an object of the invention to provide photographic apparatus of the self-developing type which is adapted for use with film units requiring an even number of geometrical reversals and with those requiring an odd number of geometrical reversals to provide a geometrically non-reversed positive image in the film unit.

Another object of the invention is to provide an optical system for a camera of the self-developing type which can geometrically reverse an image of a subject either an even or odd number of times.

Another object of the invention is to provide a camera of the self-developing type with means for automatically correlating the optics of the camera with the type of film unit being exposed in order to produce a geometrically non-reversed positive image in the film unit.

Another object of the invention is to provide a camera of the self-developing type including first and second angularly disposed film receiving chambers with a pair of pressure-applying members which are adapted to define a pressure-generating gap for receiving a film unit as it is advanced from either of the chambers.

Another object of the invention is to provide a method for operating a camera so as to correlate the optics of the camera with the type of film unit being exposed in order to produce a geometrically nonreversed positive image in the film unit.

Other objects of the invention will in part be obvious and will in part appear hereinafter.

The invention accordingly comprises the method involving the several steps and the relation and order of one or more of such steps with respect to each of the others and the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 3 is a diagrammatic representation of the optical path through the cylindrical lenses of FIG. 2 when a cylindrical field lens has been inserted therebetween;

FIG. 4 is a diagrammatic representation of a nonsymmetrical subject;

FIG. 5 is a diagrammatic representation of a mirror image of the subject of FIG. 4;

FIG. 6 is a diagrammatic illustration of the image of the subject of FIG. 4 focused at the film plane of a camera employing a conventional lens assembly;

FIG. 7 is a diagrammatic illustration of an image of the subject of FIG. 4 formed at the film plane by the lens assembly of the camera of FIG. 1;

FIG. 8 is a diagrammatic illustration of a positive photoprint formed by the image of FIG. 7 and rotated 180°;

FIG. 9 is a schematic elevational view of another embodiment of the instant invention;

FIG. 10 is a schematic elevational view of still another embodiment of the instant invention;

FIG. 11 is a schematic elevational view of still another embodiment of the invention; and FIG. 12 is an enlarged view of a portion of FIG. 11.

DETAILED DESCRIPTION OF THE INVENTION

Figure 1:
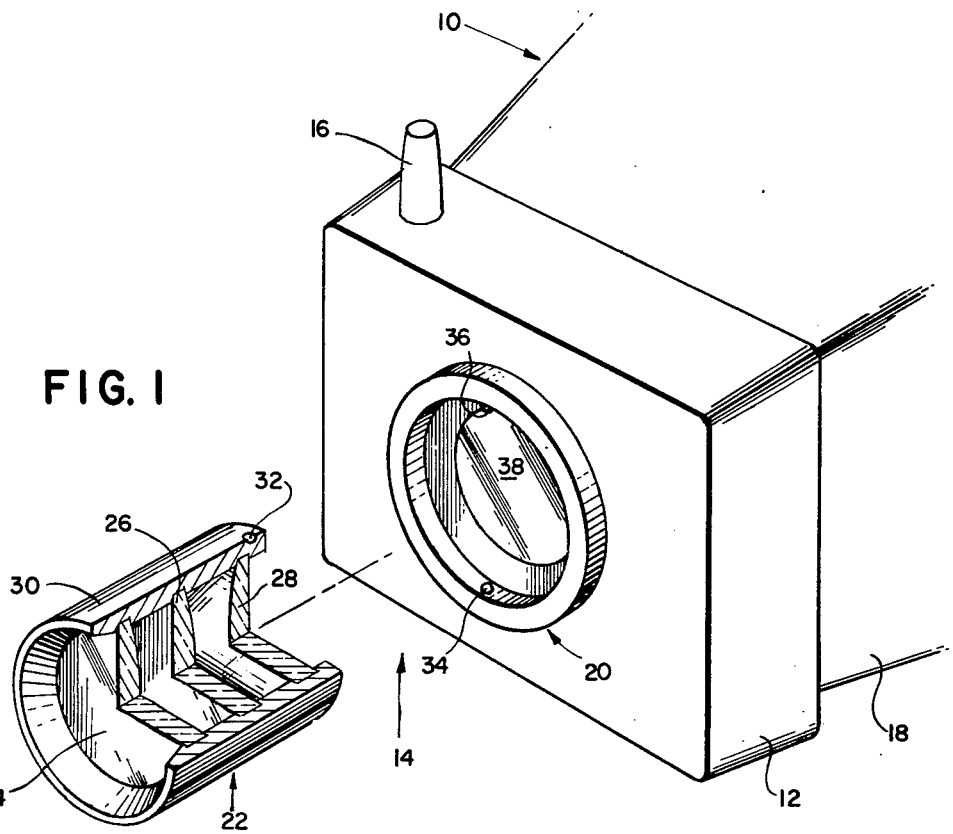
FIG. 1 is a simplified exploded perspective of a preferred embodiment of the subject invention.

Reference is now made to FIG. 1 of the drawings wherein is illustrated a front portion of a camera 10 having an exposure control system housing 12 within which are mounted all of the components required to regulate light passing into the camera. These components include, but are not limited to, an objective lens assembly 14, a shutter mechanism (not shown), a shutter actuation button 16, a portion of an exposure chamber housing 18 and electronic control circuitry (not shown).

The photographic camera 10 further includes a back portion (not shown) connected to chamber 18 which serves as a receiving and retaining chamber for a cassette structure (not shown) laden with film of the type described in U.S. Pat. No. 3,415,644 or with film of the type described in U.S. Pat. Nos. 2,983,606 and 3,761,271. The photographic camera 10 and its associated components, with the exception of the objective lens assembly 14, are otherwise generally conventional and are generally similar to the corresponding components of the Square Shooter II camera manufactured and sold by Polaroid Corporation of Cambridge, Mass.

The objective lens assembly 14 includes a subassembly 20 and refracting means in the form of a subassembly 22. The subassembly 22 includes three cylindrical lens elements 24, 26 and 28 which are secured in spaced relation within a housing 30 having two diametrically opposed recesses 32 therein (only one being shown) which are adapted to receive a pair of resiliently mounted protrusions 34 and 36 for detachably securing subassembly 22 to subassembly 20. The subassembly 20 may typically include a conventional three-element lens assembly 38 (only one element of which is shown) such as is commonly found in the art and employed in the Square Shooter II camera, aforesaid.

The subassembly 22 preferably is of unit magnification, i.e., plus one along one axis and minus one along another axis located perpendicular thereto, but may be of the type having a net power in both of said axes so long as the reduction or magnification along each axis is the same.

Figure 2:
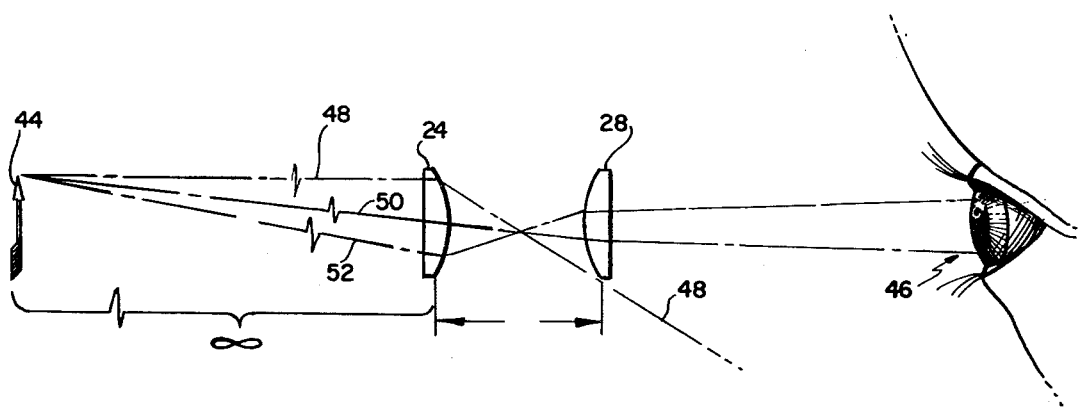
FIG. 2 is a diagrammatic representation of the optical path through a pair of cylindrical lenses.

It should be noted that the cylindrical lens elements 24, 26 and 28 are curved in the same sense, that is, they have parallel axes of curvature. Furthermore, the cylindrical lenses 24 and 28 have the same focal length and as best seen in FIGS. 2 and 3 are separated a distance equal to twice their common focal lengths. As illustrated in FIGS. 1 and 3, the cylindrical lens element 26 is positioned midway between the lens elements 24 and 28 and while the cylindrical lenses 24, 26 and 28 have each been illustrated as comprising a single element for convenience, it will, of course, be understood that each of said lenses 24, 26 and 28 may be individually composed of several elements. Furthermore, while the lens assembly 38 has been indicated to be generally conventional, it will, of course, be understood that one or more of the lens elements thereof may have incorporated therein corrections for any aberrations which might be introduced by the cylindrical lens elements 24, 26 and 28.

For a better understanding of the functioning of the subassembly 22, reference may be had to FIG. 2 wherein the lens elements 24 and 28 are shown positioned remote from a subject such as the arrow 44 which may be considered to be infinitely distant therefrom. An observer's eye is illustrated at 46 looking at the subject arrow 44 through the cylindrical lens elemets 24 and 28 which are spaced a distance equal to twice their common focal length. For purposes of illustration, cylindrical rays, 48, 50 and 52, undergo shown passing from one point on the subject arrow 44 through the lens elements 24 and 28 to the infinity s eye at 46 and it is at once apparent that rays such as 48 reaching the extreme outer edge portion of the first cylindrical lens element 24 will not reach the observer, causing such observer to experience a loss in brightness. The rays 50 and 52 passing through the cylindrical lens element 28 toward the observer at 46 are seen to be reversed top to bottom and to extend nearly parallel so that what the observer at 46 will see is a virtual image of the subject 44 at infinity. If a diagrammatic trace were made of rays emanating from the opposite end portion of the subject arrow 44 and passing through the lens elements 24 and 28, such rays like the rays 50 and 52 would appear to the observer at 46 to be nearly parallel and the observer at 46 would see a virtual image of such opposite end portion of the subject arrow 44 at infinity. However, light rays emanating from the subject arrow 44 and passing through the cylindrical lenses 24 and 28 will undergo a reversal such that what the observer 46 will see is a virtual image of the arrow 44 at infinity but upside down. Because the lens elements 24 and 28 are cylindrical, i.e., are curved only about one axis, it should be clear that the light rays from the subject 44 passing through the lens elements 24 and 28 will be imaged in only one set of planes, that is, planes perpendicular to the axis of curvature of the lens elements 24 and 28, while light rays from a particular subject point reaching the lens elements 24 and 28 in planes generally parallel to the axes of curvature of said lens elements 24 and 28 will reach the observer unaltered, i.e., as if he is looking at them through a glass window. Thus, as long as the subject 44 is positioned very far from the lens elements 24 and 28, both light rays from a particular subject point reaching the lens elements 24 and 28 in planes generally parallel to the axes of curvature of said elements 24 and 28, and those light rays reaching said lens elements 24 and 28 in planes generally perpendicular to such axes will appear to the observer as at 46 to be originating from the same plane. The observer will see a focused image inverted in one sense.

It will be recalled that certain light rays reaching extreme portions of the lens element 24 such as the light ray 48 do not reach the observer at 46 and hence he sees an image of reduced brightness. In order to insure that any such reduction in brightness is minimized, the third cylindrical lens element 26 is positioned half way between the lens elements 24 and 28, as best illustrated in FIG. 3. The cylindrical lens element 26 functions merely as a field lens and when positioned as in FIG. 3 midway between the lens elements 24 and 28 will cause the light rays such as the light ray 48 to reach the observer at 46 so that the image seen by the observer is a bright one.

In order to better visualize what is meant when it is said that the image is reversed in "one sense" reference may be had to FIG. 4 wherein a subject arrow is illustrated at 54 and is seen to comprise a symmetrical head portion 56, an elongated body portion 58, and a non-symmetrical tail portion 60, i.e., a tail portion positioned on only the left side of the arrow 54 looking into FIG. 4. Referring now to FIG. 5, the arrow 54 is shown in mirror image, i.e., reversed in one sense, with the tail portion 60 now appearing on the right (looking into FIG. 5), but with the head portion 56 remaining uppermost. Referring again to FIG. 6, the arrow 54 of FIG. 4 is illustrated imaged at the film plane of the photographic camera 10 onto a film unit 62. In the illustration of FIG. 6, the photographic camera utilized to form the image is equipped with an otherwise conventional lens such as the subassembly 20, alone, and the arrow 54 is seen to be reversed by the lens in two senses, i.e., top to bottom and side to side. If the film unit 62 is rotated 180° so that the arrow 54 now appears right side up, i.e., is reversed in one sense, the image will now be identical to that of FIG. 5 which, it will be recalled, is the mirror image of the arrow 54 depicted in FIG. 4.

Referring again to FIG. 7, the arrow 54 is shown imaged onto the film unit 62 with the cylindrical lens subassembly 22 attached to the subassembly 20 of the photographic camera 10. Again, the arrow 54 is seen to be upside down with respect to the subject depicted in FIG. 4; however, in this case, the image of the arrow 54 is reversed by the lens in only one sense, that is, top to bottom. Such a single reversal of the arrow 54 in FIG. 7 will become more clearly understood by reference to FIG. 8 which illustrates the film unit 62 of FIG. 7 with the image of the arrow 54 recorded thereon and with the entire film unit 62 being rotated 180°. Clearly, the image depicted in FIG. 8 corresponds exactly to the subject in FIG. 4, albeit the observer is looking in opposite directions.

As indicated hereinabove, certain film units by virtue of their structural parameters will record a geometrically reversed image of a subject in one sense upon direct exposure of the film unit to a selected subject. Film units of the type mentioned hereinabove in U.S. Pat. No. 3,415,644 are exemplary of such film units requiring a geometrical image reversal in one sense and it should be apparent that the photographic camera described above is readily suited to use with such film units when the lens subassembly 22 is in optical alignment with subassembly 20 and is equally suited for use with film units of the type described in U.S. Pat. Nos. 2,983,606 and 3,761,271 when the lens subassembly 20 is employed and subassembly 22 is not in optical alignment, i.e., when subassembly 22 has been detached from subassembly 20.

Figures 9, 10:
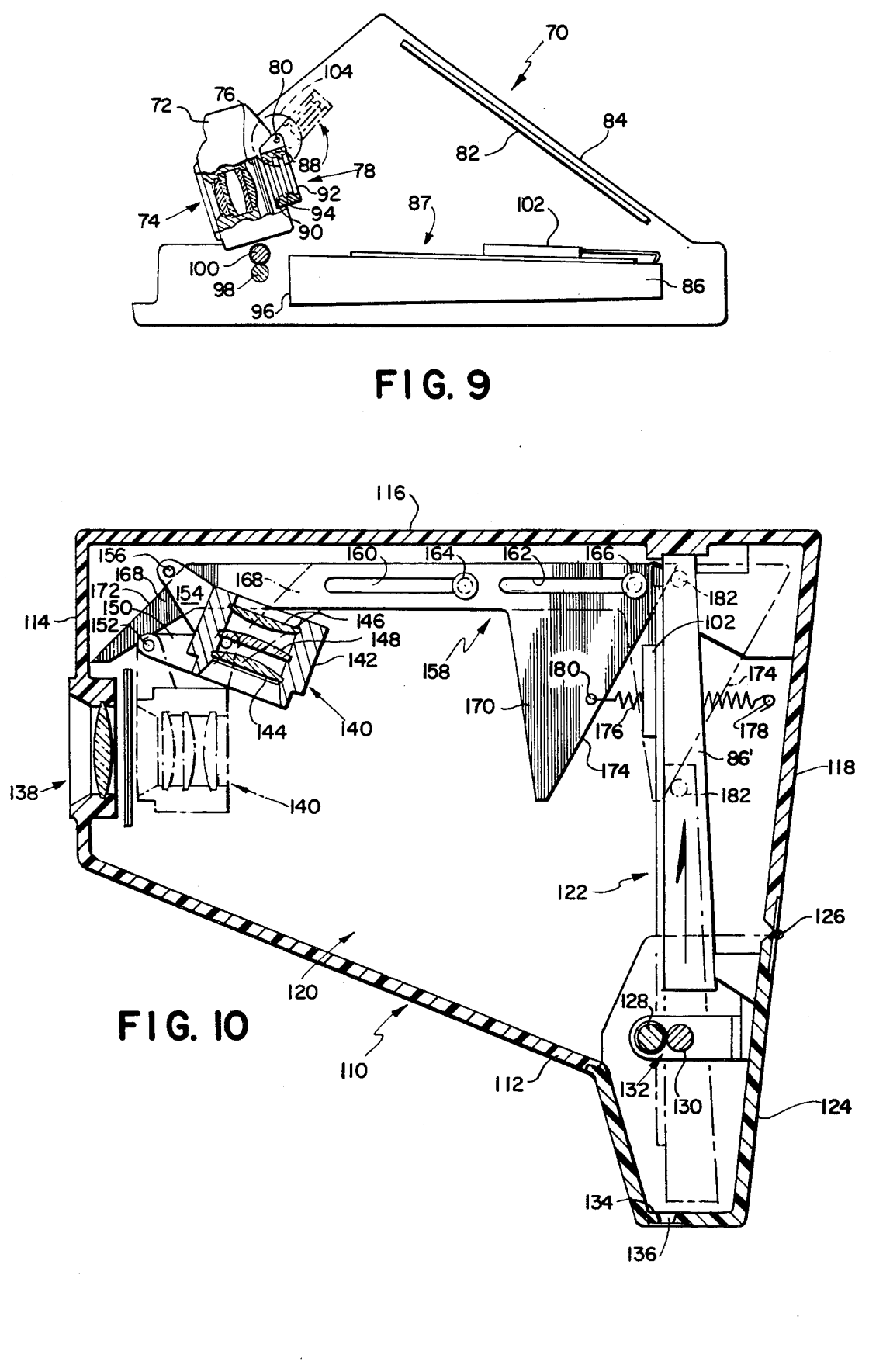

Reference is now made to FIG. 9 of the drawings wherein is shown another embodiment of the invention incorporated within a camera 70. Camera 70 includes a housing 72 enclosing a first lens assembly 74 of the conventional type, i.e., one which geometrically reverses an image of a subject along two orthogonal axes, a shutter assembly 76 and a second lens assembly 78 pivotally mounted at 80 for movement between a first position shown in solid lines, wherein it is in optical alignment with the first lens assembly 74 and a mirror 82 mounted on a wall 84 of the camera for exposing a film unit located within a film cassette 86 and a second position, shown in broken lines, wherein the second lens assembly is out of optical alignment with the first lens assembly 74 and the mirror 82.

The second lens assembly 78 generally corresponds to lens assembly 22, and includes a housing 88 enclosing cylindrical lenses 90 and 92 having the same focal length and a cylindrical field lens 94 spaced equidistantly from the other two lenses 90 and 92. However, in contrast with the lens assembly 22, the cylindrical lenses 90, 92 and 94 have been rotated ninety degrees from the position shown in FIG. 1 such that their planes of curvature run from side-to-side rather than top-to-bottom, as shown in FIG. 1. This ninety degrees of rotation functions to image the top of the subject being photographed onto the end of the film unit located furthest from the leading end wall 96 of the cassette 86.

Camera 70 further includes a pair of pressure-applying members, e.g., rollers 98 and 100 mounted adjacent the end wall 96 of the cassette 86, and film advancing means, shown schematically at 102. Also, the camera includes means e.g., a wheel 104, connected to the second lens assembly 78 for rotating the latter between the solid and broken line positions previously described.

Film cassette 86, which may be of the type shown and described in U.S. Pat. No. 3,779,770, is adapted to house film units of the type requiring an even number of geometrical reversals to provide a geometrically non-reversed positive image in the film unit or those of the type requiring an odd number of geometrical reversals to provide a geometrically non-reversed positive image in the film unit. When the cassette contains film units requiring an even number of geometrical reversals, the lens assembly 78 is located in the solid line position. When the second lens assembly is in the first or solid line position, the optical system of the camera, consisting of the first and second lens assemblies 74 and 78 and mirror 82, provides for an even number of reversals, i.e., the first lens assembly geometrically reverses the image along two orthogonal axes while the second lens assembly 78 and the mirror 82 each reverse the image along only one of the axes. Upon actuation of the shutter 76, image-bearing rays are transmitted through lens assemblies 74 and 78 and onto mirror 82 which in turn reflects these rays into an exposure aperture 87 in cassette 86 to expose the forwardmost film unit contained therein. After exposure, the film-advancing means 102 are actuated, either manually or by a motor (not shown) to advance the exposed film unit from the cassette 86 via an elongate opening (not shown) in wall 96 and between the rollers 98 and 100. The rollers 98 and 100, which may be manually or motor driven, rupture a container of processing fluid attached to the leading end of the film unit and spread the processing fluid across a photosensitive layer of the film unit to initiate formation of a visible, geometrically non-reversed, positive image therein. Alternatively, if the cassette 86 contains a plurality of film units of the type which require an odd number of geometrical reversals in order to provide a geometrically non-reversed positive image therein, the user merely rotates wheel 104 to move the second lens assembly 78 into the second or broken line position. When the second lens assembly 78 is in the broken line position, the remaining optical elements provide an odd number of geometrical reversals, i.e., first lens assembly 74 geometrically reverses the image of the subject along two orthogonal axes and the mirror in turn reverses this image along only one of these axes.

While the means for moving the second lens assembly 78 between the solid and broken line positions has been described as being manually actuated, it should be understood that this movement may take place automatically in response to some physical characteristic between those cassettes containing film units requiring an even number of reversals and those cassettes containing film units requiring an odd number of reversals, as for example, by a linkage system similar to that to be described hereinafter.

Reference is now made to FIG. 10 of the drawings wherein is shown a camera 110 incorporating yet another embodiment of the invention. Camera 110 includes a plurality of walls 112, 114, 116 and 118 which cooperate with each other to define an exposure chamber 120 and a film cassette receiving chamber 122. Entrance to chamber 122 is provided for by a film loading door 124 which is pivotally coupled to wall 118 by suitable hinge means 126. Mounted on the interior surface of door 124 is a spread roller assembly comprising a pair of elongated rollers 128 and 130. Rollers 128 and 130 cooperate to define a pressure-generating gap 132 which is located in alignment with an elongated slot 134 through which an exposed film unit is adapted to be advanced to the exterior of the camera. Slot 134 is covered in lighttight relation by a strip of resilient material 136 which is suitably connected along one of its sides to door 124. The film loading door 124 and the spread roller assembly are adapted to be pivoted in a counterclockwise direction about hinge 126 to a position wherein the film cassette 86 may be loaded into position within chamber 122.

The camera 110 includes an optical system consisting of a first lens assembly 138 which is adapted to geometrically reverse an image of a subject along two orthogonal axes and a second lens assembly 140. The second lens assembly 140 is similar to the lens assembly 22 of FIG. 1 and includes a housing 142 for mounting cylindrical lenses 144 and 146, having the same focal length and a cylindrical field lens 148 mounted equidistantly therebetween. The housing 142 includes a first centrally located flange 150 for pivotally coupling the housing 142 to suitable camera structure (not shown) via a pin 152, and a second flange 154, laterally offset from flange 150, i.e., flanges 150 and 154 are not located in a common plane. Extending laterally outwardly from flange 154 is a follower pin 156.

The camera 110 includes means for differentiating between those film cassettes containing film units requiring an even number of geometrical reversals and those requiring an odd number of geometrical reversals. Specifically, these means include a link 158 having a pair of elongated slots 160 and 162. Link 158 is slideably connected to the camera via pins 164 and 166 extending through the slots 160 and 162. Link 158 also includes first and second flanges 168 and 170 having inclined surfaces 172 and 174. A spring 176 is connected at one end thereof to a pin 178 extending from a portion of the camera wall and at its other end to an aperture 180 in flange 170 for resiliently biasing link 158 and the second lens assembly into the broken line position shown in FIG. 10.

The film cassettes 86 containing film units requiring an even number of geometrical reversals may be provided with some kind of indicia for differentiating them from cassettes containing film units requiring an odd number of geometrical reversals. For example, the film casettes of each type could be identical except for the addition of a protrusion 182 to the film cassettes containing film units requiring an even number of geometrical reversals. FIG. 10 shows such a film cassette 86' in an initial loading position (broken lines) and in its final loaded position (solid lines). It will be noted that as the film cassette is moved by the user during loading of the cassette into chamber 122, the protrusion 182 on the cassette engages inclined surface 174 on flange 170 thereby moving the link 158 from the broken line position to the solid line position. As the link 158 moves to the left, follower pin 156 "rides up" the inclined surface 172 thereby rotating the second lens assembly 140 in a counterclockwise direction about pin 152, from its normal broken line position, wherein it is in optical alignment with lens assembly 138, to the solid line position wherein it is no longer functioning as a part of the camera's optical system. Accordingly, when an exposure is made the image will only be reversed an even number of times, i.e., the lens assembly 140 will geometrically reverse the image along two orthogonal axes. When the cassette 86' containing the protrusion 182 is removed from the camera, spring 176 will return the link 158 and second lens assembly 140 to their broken line position wherein the second lens assembly is in optical alignment with the first lens assembly 138 to provide an exposure wherein the image is reversed an odd number of times. shown)

Reference is now made to FIG. 11 wherein is shown a camera 200 incorporating another embodiment of the invention. Camera 200 includes a forward wall 202 and a rear wall 204 interconnected by top and bottom walls 206 and 208 and spaced side walls 210 (only one of which is shoen) to define an exposure chamber 212. Mounted within forward wall 202 is a conventional lens and shutter assembly including a lens assembly 214 for geometrically reversing an image of a subject along two orthogonal axes and a shutter shown schematically at 216. The camera 200 includes two film cassette receiving chambers, the first chamber being defined in part by a plate 218 having an exposure aperture 220 therein and bottom wall 208 and the second chamber being defined in part by a second plate 222 having an exposure aperture 224 therein and rear wall 204. Each of the chambers also includes a spring 226 for resiliently urging the cassettes 86 and 86' toward their respective plates such that the apertures 220 and 224 telescopically receive an exposure aperture defining rib 228 on the cassettes thereby securely locating each cassette in position for exposure of one of the film units contained therein. One end of each chamber further includes a loading door 230 and 232 pivotally mounted to walls 202 and 206, respectively. The other end of each chamber opens into a lighttight common enclosure 234 defined in part by a U-shaped housing 236. The housing 236 includes first and second elongated slots 238 and 240 having suitable deflectable light sealing means 242 and 244 extending thereacross. Each of the slots is dimensioned to permit the passage of a film unit from the interior to the exterior of the camera. Mounted between the first chamber and the first slot 238, and between the second chamber and the second slot 240, is a pressure-applying assembly 246 which is adapted to spread a processing fluid across a photosensitive layer of a film unit exiting from either the first or second film cassette chamber. Pressure-applying assembly 246 preferably includes first and second juxtaposed rollers 248 and 250. The first roller 248 is mounted upon suitable camera structure (not shown) for rotation about its axis 252. The second roller 250 is rotatably mounted upon a pair of links 254 (only one being shown) for movement between the solid and broken line positions shown in FIG. 12. Specifically, each link 254, which is pivotally mounted to the camera by a pin 256, includes a first generally triangular shaped slot 258 and an arcuate slot 260. Each slot 258 is adapted to receive and support the journals (not shown) for the roller 250 while simultaneously permitting movement of roller 250 away from roller 248 during (1) spreading of a processing fluid across a photosensitive layer of a film unit being advanced therebetween and (2) movement of roller 250 between the solid and broken line positions shown in FIG. 12. Spring means (not shown) are provided for resiliently biasing the rollers toward each other. The second slot 260 is adapted to receive a reduced end portion 262 of roller 248 to allow pivotal movement of link 254 and roller 250 between the solid and broken line positions.

Referring back to the optical system of the camera for a moment, it will be noted that a second optical element, i.e., a reflecting member in the form of a mirror 264 mounted on a support member 266, is located in optical alignment with lens assembly 214 when one of the film units located within film cassette 86 is to be exposed. Support member 226 cooperates with means including a flange 268 extending from wall 206 to provide a light-tight environment for the film units contained within film cassette 86' when a film unit located within cassette 86 is being exposed. Support member 266 is supported for pivotal movement about axis 252 between the position shown in solid lines in FIG. 11 and the position shown in broken lines in FIG. 12 by a pair of links 270 (only one being shown). Each link 270 includes an inwardly facing pin 272 which is in engagement with link 254 for moving the latter into the broken line position during movement of support member 266 into its horizontal position as shown in FIG. 12. Suitable means including a manually operable knob or wheel 274 are provided for rotating the mirror 264 and its support member 266 between the position shown in FIG. 11, wherein it is in optical alignment with lens assembly 214 for directing an image onto a film unit located within cassette 86 while simultaneously preventing exposure of film units located within cassette 86', and the position shown in broken lines in FIG. 12, wherein it is out of optical alignment with the lens asembly 214 and in light-tight relation to the film cassette 86. Suitable spring means (not shown) are provided for returning link 254 and mirror 264 to their solid line positions.

When it is desired to expose a film unit of the type contained within cassette 86, i.e., one which requires an odd number of geometrical reversals to provide a geometrically non-reversed positive image in the film unit, the mirror 264 is positioned in optical alignment with the lens assembly 214 and the rollers assume the position shown in FIG. 11. Shutter 216 is actuated and the image of the subject being photographed is geometrically reversed along two orthogonal axes by the lens assembly 214 onto mirror 264 which then provides for a single reversal of the image as it reflects the image onto the photosensitive layer of the film unit in cassette 86. Subsequent to exposure, the film advancing means 102 is actuated, either by a battery driven motor or manually, to engage the exposed film unit and advance it into engagement with the rollers 248 and 250. Rotation of roller 248, either by a motorized or manual drive, is transmitted via the exposed film unit to roller 250 thereby advancing the exposed film unit therebetween while simultaneously spreading a processing fluid across the exposed photosensitive layer to initiate formation of a visible, geometrically non-reversed, positive image in the film unit. The leading edge of the exposed film unit advances to a position whereat it deflects the light shield 242 as the film unit exits from the camera via slot 238.

Conversely, when it is desired to expose a film unit located in cassette 86', i.e., one requiring an even number of geometrical reversals to provide a geometrically non-reversed positive image in the film unit, wheel 274 is rotated in a counterclockwise manner, as viewed in FIG. 11, to move the mirror support 266 out of optical alignment with the lens assembly 214 and into the position shown in broken lines in FIG. 12. Rotation of mirror support 266 as aforesaid results in pin 272 rotating about axis 252 while simultaneously moving along an edge 255 of link 254 thereby pivoting link 254 and roller 250 about 254 into the broken line position of FIG. 12. Rollers 248 and 250 now define a pressure-generating gap located in alignment with the path of travel of a film unit as it exits from cassette 86'. After the scene has been focused, shutter 216 is actuated and lens assembly 214 geometrically reverses the image of the scene along two orthogonally disposed axes. The exposed film unit is then advanced and processed as aforesaid.

Alternatively, movement of mirror 264 from the first, solid line position to the second, broken line position may take place automatically in response to a film cassette 86' being inserted into the second chamber. For example, mirror support 266 may be provided with a member which is adapted to be engaged and cammed away from the second chamber by a portion of a film cassette 86' during loading of the latter into the second film chamber thereby moving mirror 264 against its spring bias into the second broken line position.

From the foregoing it can be seen that there has been disclosed a family of novel cameras which are capable of exposing film units of the type requiring either an odd or even number of geometrical reversals to provide a geometrically non-reversed visible positive image in the exposed film unit. The versatility of the foregoing cameras now enables the owner of such cameras to take advantage of any difference in costs, availability, etc., between the two types of film.

Since certain changes may be made in the above-described invention without departing from the scope thereof, it is intended that all matter contained in the above description or shown in the accompanying drawings shall be interpreted as illustrative and not in a limiting sense. For example, while the apparatus for advancing the film and for rotating the spread rollers has been described as being manually or motor driven, it should be understood that the individual film units could be provided with leaders as shown in the above-mentioned U.S. Pat. No. 3,761,271 thereby obviating the need for the film advancing and roller drive structures. Further, as regard the embodiment of the invention shown in FIG. 11, suitable means may be provided for precluding insertion of cassettes 86 and 86' in the wrong film cassette chamber. Further, should the different film units described above require different spreading speeds of pressure between the spreading members, suitable means readily available in the art may be provided for accomplishing the same.

What is claimed is:

1. Photographic apparatus of the self-developing type for use with film units requiring an even number of geometrical reversals and with film units requiring an odd number of geometrical reversals to provide a geometrically non-reversed positive image in the film unit, comprising:

means for locating a film unit in position for exposure;
    pressure-applying means including at least two juxtaposed members for spreading a processing fluid across a photosensitive layer of the film unit;
    lens means for geometrically reversing an image of a subject along two orthogonal axes;
    optical means including first and second means each of which geometrically reverses the image of the subject along only one of said orthogonal axes, said optical means being mounted on the side of said lens means which is opposite to the side of said lens means which faces the subject to be photographed; and
    means for moving said first means between a first position wherein it is in optical alignment with said lens means and said second means so as to receive the image being transmitted by said lens means when the film unit requires an even number of geometrical reversals and a second position out of optical alignment with said lens means and said second means when the film unit requires an odd number of geometrical reversals.

2. Photographic apparatus as defined in claim 1 wherein said first means comprises refracting means.

3. Photographic apparatus as defined in claim 2 wherein said refracting means comprises at least two spaced cylindrical lenses.

4. Photographic apparatus as defined in claim 3 wherein said second means comprises reflecting means.

5. Photographic apparatus as defined in claim 2 further comprising film-advancing means mounted in position to engage the film unit and advance it out of said exposure position and toward said pressure-applying means.

6. Photographic apparatus as defined in claim 1 wherein said second means comprises reflecting means.

7. Photographic apparatus as defined in claim 6 wherein said first means comprises refracting means.

8. Photographic apparatus as defined in claim 6 further comprising film-advancing means mounted in position to engage and advance a film unit away from said exposure position and toward said pressure-applying means.

* * * * *